US009227289B2

(12) United States Patent
Tamm

(10) Patent No.: US 9,227,289 B2
(45) Date of Patent: Jan. 5, 2016

(54) ASSEMBLY KIT FOR UPGRADING AN ELECTRODE GRINDING DEVICE AND ELECTRODE GRINDING DEVICE

(75) Inventor: Rolf Tamm, Salem (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 576 days.

(21) Appl. No.: 13/514,257

(22) PCT Filed: Oct. 13, 2010

(86) PCT No.: PCT/EP2010/065338
§ 371 (c)(1),
(2), (4) Date: Jun. 6, 2012

(87) PCT Pub. No.: WO2011/069718
PCT Pub. Date: Jun. 16, 2011

(65) Prior Publication Data
US 2013/0288580 A1 Oct. 31, 2013

(30) Foreign Application Priority Data
Dec. 10, 2009 (DE) .......................... 10 2009 044 855

(51) Int. Cl.
B24B 27/00 (2006.01)
B24B 23/02 (2006.01)
B24B 41/06 (2012.01)
B24B 19/16 (2006.01)
B23K 11/30 (2006.01)
B23K 35/40 (2006.01)

(52) U.S. Cl.
CPC ............. *B24B 19/16* (2013.01); *B23K 11/3063* (2013.01); *B23K 35/402* (2013.01); *B24B 23/02* (2013.01); *B24B 27/0076* (2013.01); *B24B 41/066* (2013.01)

(58) Field of Classification Search
CPC .... B24B 27/00; B24B 27/0076; B24B 23/00; B24B 23/02; B24B 23/005; B24B 41/06; B24B 41/066; B24B 19/16; B23K 11/3063
USPC .................... 451/65, 282, 344, 359, 363, 415
See application file for complete search history.

(56) References Cited

U.S. PATENT DOCUMENTS

| | | | | |
|---|---|---|---|---|
| 3,498,008 A * | 3/1970 | Turner Milo I, Jr. | ........... | 451/344 |
| 4,069,619 A * | 1/1978 | Escamilla | ........ | 451/65 |
| 4,842,456 A * | 6/1989 | Saito | ............. | 409/145 |
| 5,210,977 A * | 5/1993 | Werner | ........ | 451/283 |
| 5,313,742 A * | 5/1994 | Corcoran et al. | ............. | 451/541 |
| 5,676,591 A * | 10/1997 | Huang | ........ | 451/359 |
| 6,106,372 A * | 8/2000 | Clark | ............... | 451/56 |
| 6,116,995 A * | 9/2000 | Chao | ............. | 451/351 |
| 6,676,500 B1 * | 1/2004 | Lin | ............. | 451/359 |
| 6,918,823 B2 * | 7/2005 | Tamm | ........ | 451/65 |
| 7,488,239 B2 * | 2/2009 | Tamm | ........ | 451/282 |
| 2004/0127149 A1 * | 7/2004 | Tamm | ........... | 451/65 |
| 2008/0108284 A1 * | 5/2008 | Tamm | ........... | 451/282 |
| 2012/0289130 A1 * | 11/2012 | Tamm | .......... | 451/363 |

* cited by examiner

Primary Examiner — Eileen Morgan
(74) Attorney, Agent, or Firm — Lazaris IP

(57) ABSTRACT

An assembly kit for upgrading a device for grinding welding electrodes with a grinding wheel driven by a driving motor with a shaft, which runs in a two-portion housing, wherein at least one opening is provided in the housing for guiding a welding electrode for grinding in a defined position relative to the grinding wheel, further characterized by a further grinding wheel, a spacer ring having a diameter corresponding to the diameter of the housing and a thickness corresponding to the thickness of the grinding wheel, and a centering sleeve with an axial length which is larger than the thickness of the grinding wheel.

8 Claims, 5 Drawing Sheets

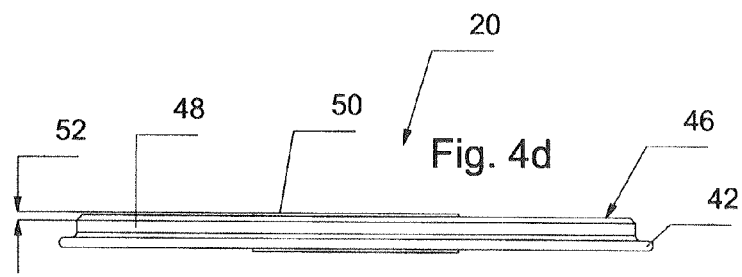
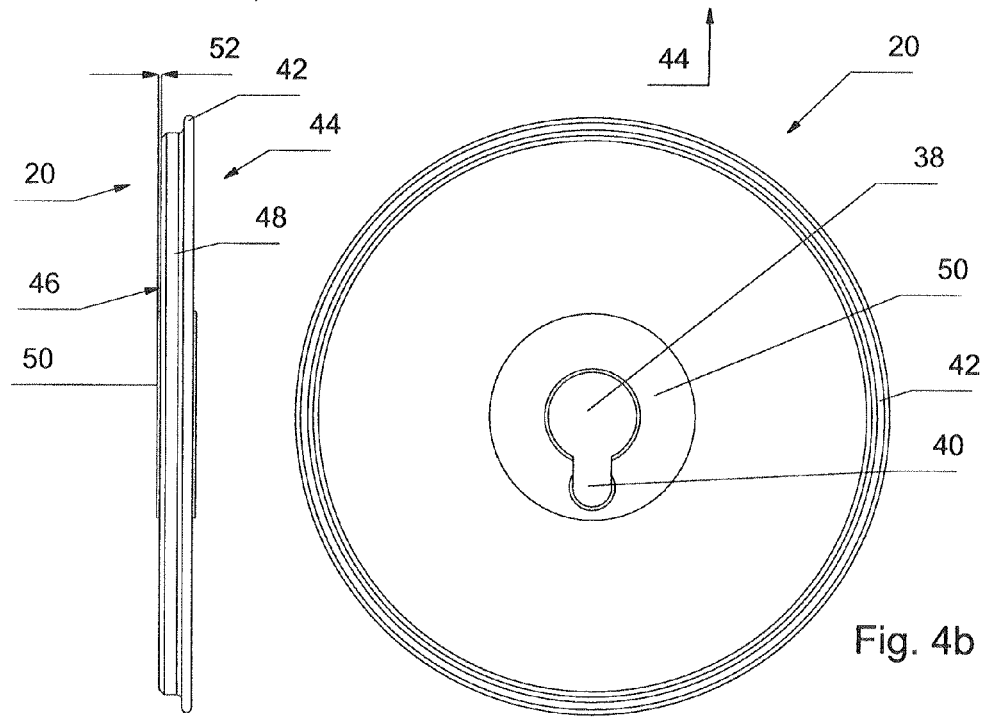
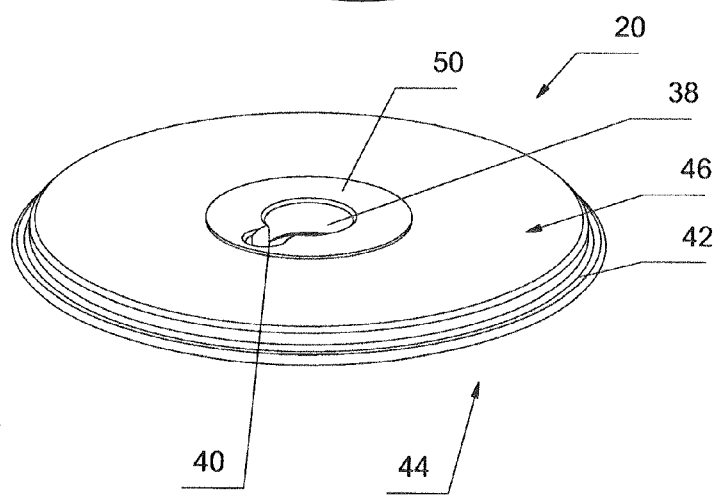
Fig. 4d
Fig. 4b
Fig. 4c
Fig. 4a

US 9,227,289 B2

ASSEMBLY KIT FOR UPGRADING AN ELECTRODE GRINDING DEVICE AND ELECTRODE GRINDING DEVICE

CROSS REFERENCE TO RELATED PATENT APPLICATIONS

This patent application is a continuation of PCT application PCT/EP2010/065338, filed herewith for the U.S. National Stage under 35 U.S.C. §371, and claims priority to said PCT application PCT/EP2010/065338, with an international filing date of 13 Oct. 2010 and a Convention priority date of 10 Dec. 2009. The contents of this application are incorporated in their entirety herein. This application is also related to U.S. non-provisional patent application titled Assembly For Grinding Electrodes And Grinding Wheel, filed concurrently herewith.

STATEMENT REGARDING FEDERALLY-SPONSORED RESEARCH OR DEVELOPMENT

Not applicable.

TECHNICAL FIELD

The invention relates to an assembly kit for upgrading a device for grinding welding electrodes with a grinding wheel driven by a driving motor with a shaft, which runs in a two-portion housing, wherein at least one opening is provided in the housing for guiding a welding electrode for grinding in a defined position relative to the grinding wheel.

The invention further relates to a device for grinding welding electrodes with two grinding wheels driven by a driving motor with a shaft, which run in a common space inside a two-portion housing, wherein at least one opening is provided in the housing for guiding a welding electrode for grinding in a defined position relative to the grinding wheel.

Welding electrodes consist of very hard and high-temperature resistant material, such as tungsten. There are welding electrodes with different cross sections. The welding electrodes have a tip or edge at one end. The shape of the welding electrode depends on its application. The tips of the welding electrodes wear out during operation.

Welding electrodes can be bought without shaping or with a ready-made tip. After use the tip or the shape is worn out. The welding electrodes are then reshaped or disposed of. Due to the precious material this is expensive.

BACKGROUND OF THE INVENTION

It is known to grind electrodes. This is commonly effected manually with open grinding—or separating wheels. Such methods are imprecise and dangerous. Furthermore, there are devices with open grinding wheels where the welding electrodes are guided through a guiding sleeve with a certain angle relative to the grinding wheel. Such devices are also expensive. In particular, it is expensive to adapt such a device to various types of welding electrodes or for different tips or cutting shapes. In particular, this requires a time-consuming exchange of the guiding sleeves.

A device where electrodes can be produced with a plurality (for example 6) of different electrode diameters with a plurality of different tip angles (for example 4) with many lengths is a valuable, cost-saving aid.

DE 100 10 520 A1 discloses a device for grinding welding electrodes with a grinding wheel. The grinding wheel rotates in a grinding wheel housing. The device is provided with an additional housing portion which is adapted to be fixed to the grinding wheel housing and which is provided with at least one opening for guiding a welding electrode for grinding in a defined position relative to the grinding wheel. The plane of the grinding wheel is essentially the separating plane between the grinding wheel housing and the additional housing portion. The additional housing portion can be provided with a plurality of adjacent, different openings for receiving different kinds of welding electrodes. The additional housing portion can, however, also be provided with a plurality of adjacent openings having an axis cutting the plane of the grinding wheel under different angles. A radial slit can be formed in the grinding wheel housing extending along the front end of the housing, which is used to pass a welding electrode for cutting at the outer perimeter of the grinding wheel. The grinding wheel of the disclosed device is fixed to a grinding wheel reception which in turn is connected to a driving shaft of a driving motor. The entire device forms a portable unit.

US 2004/0127149 A1 discloses an assembly where two parallel grinding wheels with different grain sizes are used. A first grinding wheel rotates in a space between the motor unit and a first housing portion. The second grinding wheel rotates in a second space between the first housing portion and the second housing portion. The housing portions are provided with openings for guiding the welding electrodes. The known assembly enables the use of different grinding wheels with standard diameters without the need of an exchange.

Further to a motor in a motor unit the assembly makes use of further housing portions: a motor flange directly screwed to the motor unit and at least one housing portion provided with openings for guiding the electrodes. The openings extend from the side of the housing portion opposite to the motor in the direction of the grinding wheel rotating between the motor flange and the housing portion. Depending on the amount of grinding wheels further housing portions are added. Here also the openings extend from the side opposite the motor. In other words, the electrodes are always inserted into the openings in a direction towards the motor. Depending on the amount of housing portions the assembly is relatively long and requires a long driving shaft. Several fixing elements, such as screws, nuts, pins, etc. are required for fixing the housing portions.

US 2008/0108284 A1 discloses an assembly where two grinding wheels or grinding surfaces having a different grain size rotate in practically one plane in a common space. The grinding surfaces of the known assembly are facing opposite directions. A third wheel with a larger diameter is arranged between such grinding wheels. Such wheel is used for cutting electrodes. The assembly either operates with one grinding wheel with two grinding surfaces having different grain sizes or with a grinding wheel assembly comprising at least two grinding wheels.

The bore holes for guiding electrodes are produced with high precision regarding the angle. It is understood that the corresponding grinding wheel rotates in a defined position relative to the housing. With different thicknesses or with the use of several grinding wheels this is not ensured anymore. In such a case the grinding angle is not the target value.

During the production of simple grinding wheels the unprocessed raw disc is dipped into a bath for application of the grinding means. Accordingly, it is difficult to produce grinding wheels with a different grain size on the top side and bottom side. It is, therefore, much simpler to use a grinding wheel assembly with two grinding surfaces on different grinding wheels. In order to ensure that the grinding surface still rotates in the plane required for the high precision of the grinding angle very thin grinding wheels are used. The grinding wheels have a thickness which is selected in such a way that all grinding wheels together have the thickness of a standard grinding wheel which is used for simple assemblies. Consequently, the assembly only operates with high precision if grinding wheels are used which are individually manufactured.

BRIEF SUMMARY OF THE INVENTION

It is an object of the invention to provide an easy-to-handle, compact grinding device of the above mentioned kind which provides two grinding surfaces without the need of exchanging parts and which simultaneously uses grinding wheels which are easy to manufacture. Furthermore, it is an object of the invention to provide an assembly kit for upgrading known grinding devices with a further, inexpensive and simple grinding wheel with almost the same length of the device.

According to an aspect of the present invention this object is achieved with an assembly kit, comprising:

(a) a further grinding wheel;
(b) a spacer ring having a diameter corresponding to the diameter of the housing and a thickness corresponding to the thickness of the grinding wheel; and
(c) a centering sleeve with an axial length which is larger than the thickness of the grinding wheel.

The space receiving the rotating grinding wheel of the known assembly is widened with a spacer ring. The spacer ring has the thickness of one grinding wheel. Thereby, the grinding surfaces still rotate in the target plane defined by the bore holes. There is no need to add another housing portion with a further grinding wheel. Also, there is no need for a grinding wheel assembly with thin grinding wheels or grinding wheels which have different grain sizes on either side. It is possible to always use standard grinding wheels with the same thickness. The grinding wheels are centered on the same axis with a centering sleeve. The centering sleeve extends through the center bore hole beyond the thickness of one of the two grinding wheels into the center bore hole of the second grinding wheel, thereby effecting that both grinding wheels rotate about a common axis.

In a modification of the invention a screw is included which is longer than the screw provided for the simple device with only one grinding wheel. The screws provided for devices already on the market only have a minimum length which is required for the secure fixing of the wheel. Under certain circumstances, such a length may not be sufficient for two wheels. Accordingly, it may be useful to provide an assembly kit with an additional screw which is longer by about one thickness of a wheel.

In a further modification of the invention a further housing portion has at least one opening for guiding a welding electrode for grinding in a defined position relative to the grinding wheel. With such an assembly kit grinding devices can be updated which were operated only with one grinding wheel which has been used from one side only. With a further housing portion with openings for welding electrodes such assemblies can be updated for the use with two grinding wheels. In particular, the further housing portion may be the motor flange. Then, the "old" motor flange without bore holes may be replaced by the "new" motor flange with bore holes.

In addition to the assembly kit for upgrading known devices the invention relates to a device for grinding welding electrodes of the above mentioned kind. The device is provided with (a) a spacer ring having a diameter corresponding to the diameter of the housing and a thickness corresponding to the thickness of the grinding wheel; and
(b) a centering sleeve with an axial length which is larger than the thickness of the grinding wheel.

Contrary to known devices with two grinding wheels in a common space, the device according to the present invention operates with a spacer ring enabling the use of standard grinding wheels. As with the above explained assembly kit both grinding wheels are centered with a centering sleeve.

Preferably, the grinding wheels have different grain size, and the openings in one housing portion are formed by bore holes having an angle relative to the grinding wheel and a diameter corresponding to bore holes in the other housing portion. In other words: Each bore hole or at least several bore holes in the first housing portion correspond to a corresponding bore hole having the same diameter and the same grinding angle in the second housing portion. With such an assembly the grinding wheel with rough grains can be used to abrase large amounts of material. The grinding wheels with fine grains can be used for the fine grinding. As the bore holes have the same properties the grinding angle for the selected diameter will not vary. It is particularly advantageous, if the housing portions are produced with the same manufacturing machine and/or with the same settings for producing the bore holes. Thereby, deviations of the geometric properties of the bore holes will be particularly small. The electrode tips can be manufactured and/or reshaped with particularly high precision.

Preferably, one of the grinding wheels is provided with a cutting edge outwardly projecting in a radial direction. This grinding wheel has a slightly larger diameter than the other grinding wheel. However, it is also possible to provide cutting edge on both grinding wheels which are provided on the sides facing the other grinding wheel. They will then form a common cutting edge.

Preferably, an also rotating collision disk is provided which is arranged between the housing portion at the motor side and the grinding wheels and which is form-fittingly connected to the shaft by an integrated sleeve. The collision disk prevents dust, material particles and grinding material from entering the motor or the bearings. The entering of particles into the motor or the bearings can be reduced further, if a ring of soft material, in particular of felt is fixed to the housing which is arranged around the sleeve of the collision disk.

Further modifications of the invention are subject matter of the subclaims. An embodiment is described below in greater detail with reference to the accompanying drawings.

BRIEF DESCRIPTION OF THE SEVERAL VIEWS OF THE DRAWINGS

FIG. 4(*a*)-4(*d*) are views of the grinding wheel with cutting edge in greater detail.

DETAILED DESCRIPTION OF THE INVENTION

Figure 1:
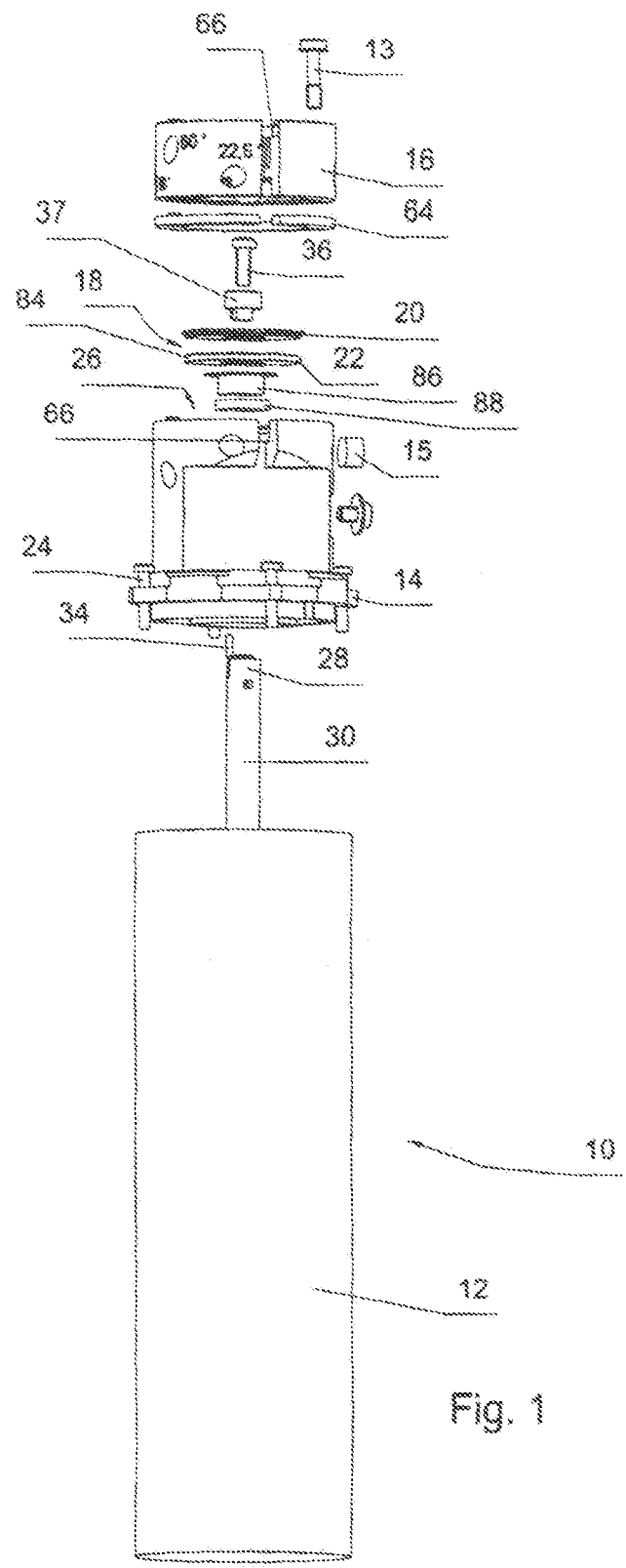
FIG. 1 is an exploded view of a device for grinding electrodes with two grinding wheels.
Figure 2:
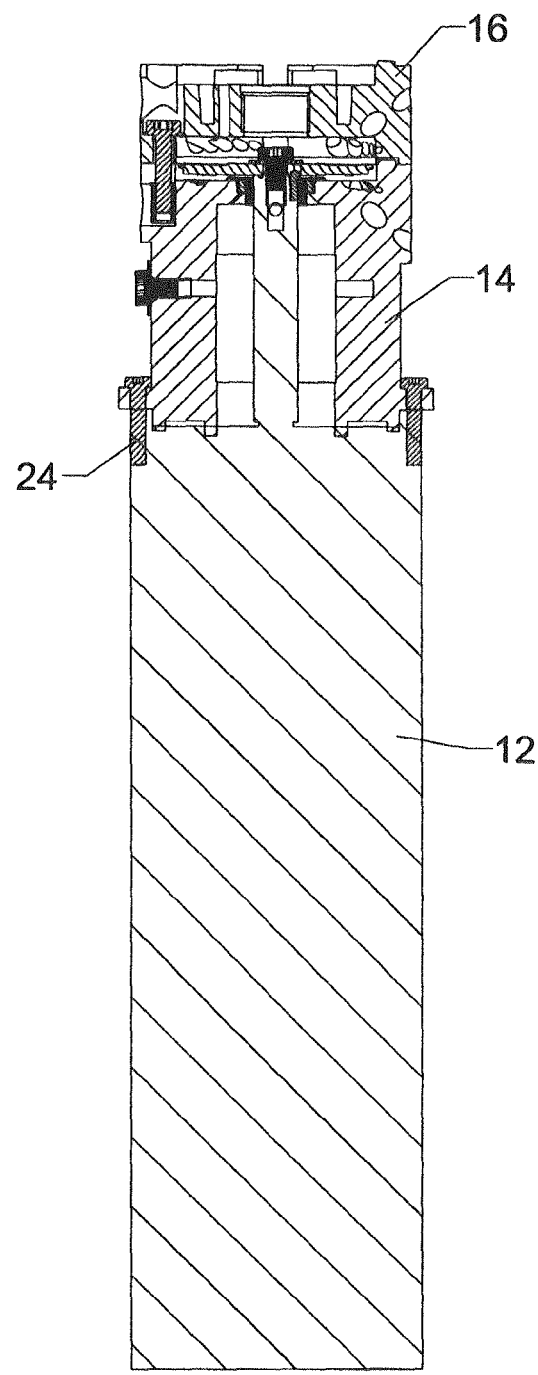
FIG. 2 is a cross sectional view of a device for grinding electrodes with a grinding wheel.

Numeral 10 in the figures generally denotes a device for grinding welding electrodes made of tungsten. The device 10 comprises a motor with a motor housing 12, a motor flange 14 screwed to the motor housing 12 and a cylindrical housing portion 16 mounted on the motor flange 14. The housing portion 16 is connected to the motor and the motor flange in a way which is described below in greater detail. A grinding wheel assembly 18 with grinding wheels 20 and 22 having different grain size rotates in the range between the motor flange 14 and the housing portion 16.

The flange is provided with bore holes. The motor flange 14 is screwed to the motor housing 12 with screws extending through such bore holes as shown in FIG. 1. The housing portion 16 is tightly connected to the motor flange 14 with a screw 13 and a nut 15. For this purpose the housing portion 16 has a bore hole and the motor flange a receptacle for the nut 15.

A disc-shaped recess is provided in the end 26 of the motor flange 14 opposite the motor end. This recess serves to receive the grinding wheel 22. The shaft 30 screwing the grinding wheel assembly 18 to the motor, simultaneously serves as motor shaft.

Figure 3:
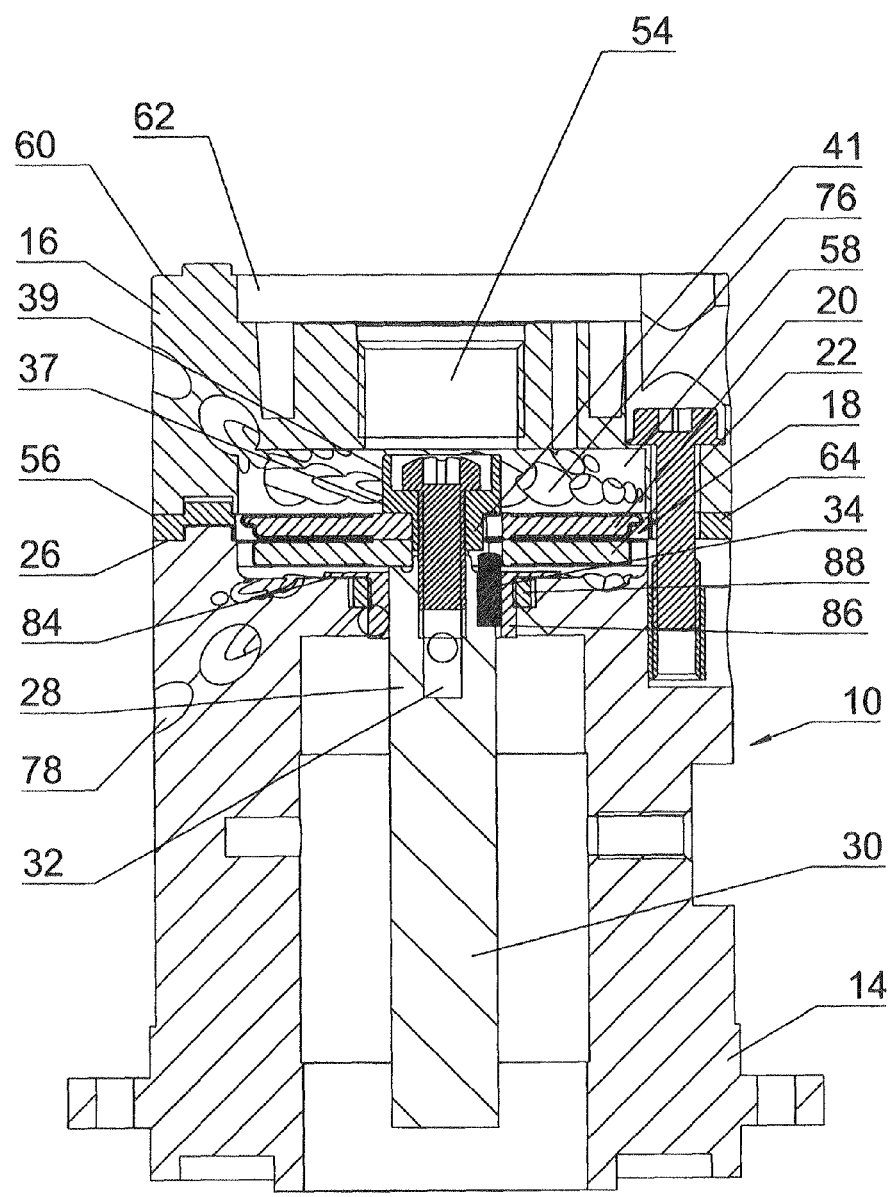
FIG. 3 is a view of the head of the assembled device in greater detail.

The shaft 30 has an upper portion 28. Furthermore, the shaft 30 has a bore hole 32 with an inner thread in the upper portion 28. In addition, an extra-centric pin 34 is fixed to the upper portion 28. The grinding wheels 20 and 22 of the grinding wheel assembly 18 are provided with a central bore hole 38 and an extra-centric bore hole 40 connected thereto. They can be seen well in FIGS. 4a and 4b. the grinding wheels 20 and 22 are mounted on the shaft 30 and screwed together with a screw 36 in such a way that the central bore hole 38 is aligned with the axial bore hole 32 in the shaft 30 and that the pin 34 extends through the extra-centric bore hole 40 in the grinding wheel 22 on the side of the motor. The grinding wheels rotate about the axis of the bore holes 32 and 38 while the pin 34 engages with the bore hole 40 and transfers the driving power on the grinding wheel assembly 18. A centering sleeve 37 is inserted from above through the center bore holes 38 of the two grinding wheels 20 and 22. The upper end of the centering sleeve 37 opposite to the motor end is provided with a receptacle 39 for the screw head of the screw 36. The centering sleeve 37 ensures that both grinding wheels 20 and 22 rotate about the same axis. The centering sleeve 37 is provided with a projecting nose 41. The nose engages in the extra-centric bore holes 40 of the grinding wheels 20 and 22. In such a way the driving power of the motor is transferred from the first, motor-side grinding wheel 22 through the centering sleeve 37 to the second, upper grinding wheel 20. The centering sleeve 37 is screwed to the shaft together with the grinding wheels 20 and 22 with the screw 36. This can be particularly well seen in FIG. 3.

In this present embodiment the grinding wheel assembly 18 comprises a grinding wheel 20 with rough grains and a grinding wheel 22 with fine grains which is otherwise the same. The grinding wheel 20 has a particularly sharp edge 42. This edge 42 serves to cut electrodes with improved cutting behavior. The edge is integrated in grinding wheel 20 in such a way that one of its sides lay in the grinding plane. This can be well seen in FIGS. 4c and 4d. In such a way one of the grinding surfaces, i.e. grinding surface 44, is larger on the side of the edge 42, than the opposite grinding surface 46.

The grinding wheels 20 and 22 are made of a green body 48. The green body 48 is dipped into a bath with grinding material. The grinding material, for example diamond grains of a selected grain size, sticks to the green body. Depending on the grain size different green bodies are used. Each green body has a center range 50 which is not coated. The bore holes 38 and 40 are provided in such uncoated center range 50. The center range 50 has a standard thickness which is the same for all green bodies independent from the grain size. Accordingly, the wheels will completely lie upon each other in this range if several wheels are used. Furthermore, the green bodies are provided with a wide, area-like recess extending up to the edge. The recess quasi forms an elongated step extending over the entire angular range of the green body. In the plane of the edge 42 the step has a larger outer diameter than in the opposite plane. This can be seen in FIGS. 4c and 4d. The depth of the recess designated with numeral 52 in FIGS. 4c and 4d, corresponds to the average thickness of the selected grains. If a fine grain size is selected the recess has a small depth 52. If a rough grain size is selected the depth of the recess 52 is larger. In each case the depth 52 of the recess is selected in such a way that the thickness of the grinding wheel is essentially the same over its entire range. Then the grinding wheels will smoothly lie on top of each other and always require the same space for rotation independently of the grain size.

If the grinding wheel assembly 18 is installed with the shaft 30 the essentially cylindrical housing portion 16 and a spacer ring 64 are coaxially mounted on the motor flange 14.

The housing portion 16 is provided with a center bore hole 54. This can be seen in FIG. 3. The center bore hole is aligned with the bore holes 38 of the grinding wheel assembly 18 and the rotational axis of the shaft 30. A disc-shaped recess 58 is provided around the bore hole 54 on the side 56 facing the motor. A recess 62 is provided on the opposite side 60 of the housing portion 16. Such recesses 58 and 62 have about the same dimensions as the recess on the side 26 of the motor flange 14. The recesses on the side 26 and the recess 58 form a space in the assembled device. The space serves to accommodate the grinding wheel assembly 18. A spacer ring 64 is provided between the motor flange 14 and the housing portion 16. The thickness of the spacer ring 64 corresponds to the thickness of one grinding wheel 20 or 22. Accordingly, the difference caused by the additional grinding wheel is compensated. Independently from the amount of grinding wheels the same motor flange 14 and the same housing portion 16 with the same recesses 26 and 58 may be used in all cases. The grinding angle will not differ.

The recess 62 on the upper side 60 serves as accommodating means for the removal of grinding left-overs such as dust and grinding chips. The housing 16, ring 64 and motor flange 14 also are provided with a longitudinal slit 66 in a radial direction extending over the entire length of the assembly. The longitudinal slit 66 can be seen in FIG. 1. The slits 66 in the motor flange 14, ring 64 and housing 16 are positioned on top of each other. The slit 66 formed in such a way is wide enough to let electrodes pass therethrough. The electrode can be shortened at the edge 42 when the grinding wheel assembly 18 rotates, by cutting the used-up end of the electrode or the newly shaped electrode end.

Figure 5:
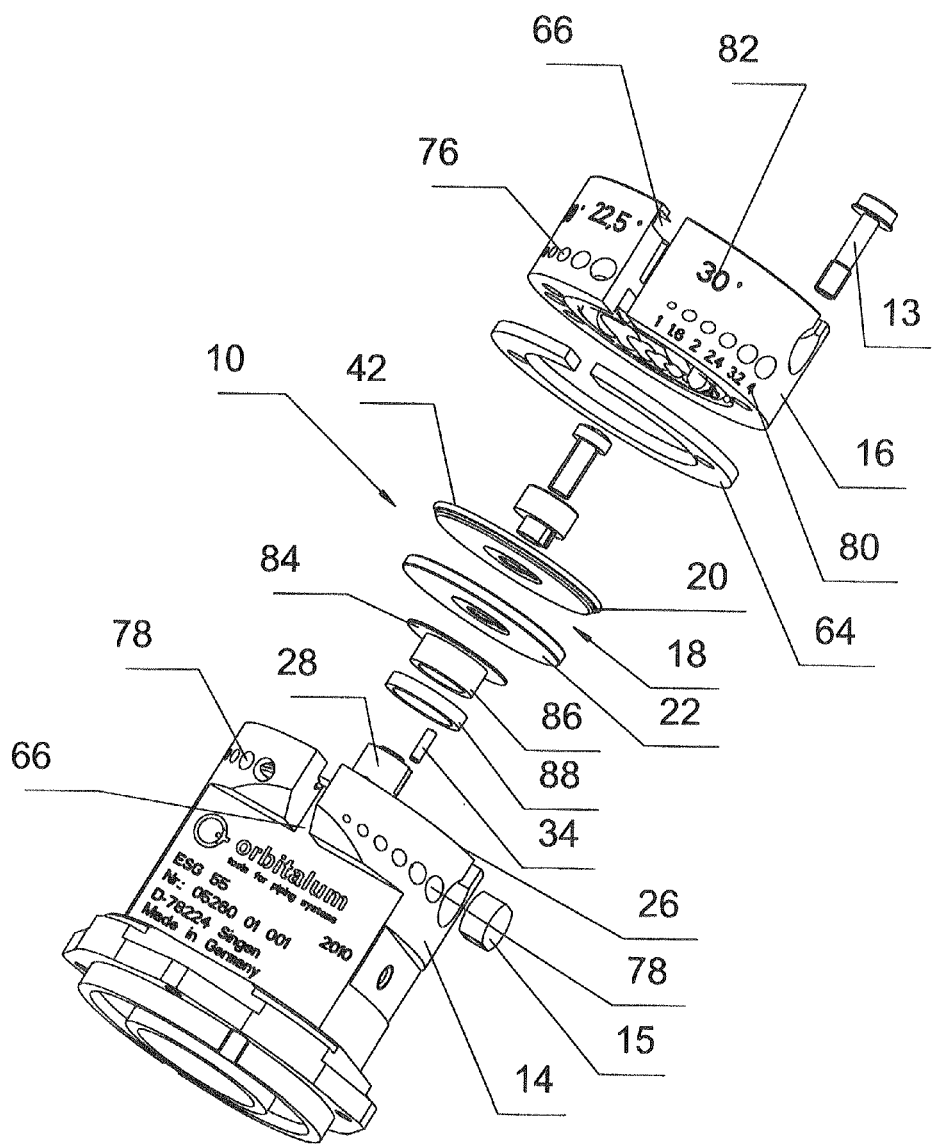
FIG. 5 is an exploded view of the head of the assembled device in greater detail.

The housing 16 and the motor flange 14 are provided with groups 76 and 78 of openings in the form of bore holes. The bore holes extend along the circumference of the housing 16 and motor flange 14 in the direction of the corresponding end faces in the direction of the grinding wheel next to the housing or motor flange, respectively. Each group consists in known manner of a plurality of bore holes with different diameters which is indicated above or below the bore hole by an engraving 80. This can be seen in FIG. 5. The angle between an electrode inserted into the bore hole and the grinding wheel is the same for all bore holes in one group. For example, the bore hole may have a diameter of 4 mm and a grinding angle of 30 degrees. The grinding angle for each group is indicated by another engraving 82 above the first engraving. For example, four different angles are possible for a grinding. Electrodes having, for example, 6 different diameters may be used. The electrode is guided in the bore hole so well that reproducible results can be obtained without difficulty or risk.

More grinding angles, further electrode diameters or the use of a grinding surface with different grain size can be introduced by using a motor flange 14 also having such bore holes 78 and using two grinding wheels. An electrode, for example, can be roughly pre-ground by entering a bore hole in the housing 16. A grinding wheel 20 having a rough grain size is provided with the grinding surface facing upwards in the drawing. A bore hole in the motor flange 14 is used for fine grinding. The corresponding grinding wheel 22 with a grinding surface facing downwards is provided with fine grains. The bore holes 76 in the housing portion 16 as well as the bore holes 78 in the motor flange were manufactured with the same machine using identical settings. Therefore, the bore holes are identical apart from very small deviations. The grinding surface in the present assembly is always in the same plane. In such a way a particularly small error is made for the grinding angle. In the present example the bore holes 76 are made in such a way that the indicated grinding angle is achieved if the grinding surface is in the plane 60 and the bore holes 78 if the grinding surface is in the plane which lays on wheel thickness below the plane 26.

Furthermore, the housing 16 is provided with a group of bore holes extending perpendicular from the upper end to the lower end of the housing 16. The bore holes of such group also have different diameters corresponding to the diameters of the remaining groups. The bore holes of the group enable the perpendicular grinding of the electrode tips.

The entire assembly is screwed on a hand-held device. The grinding wheel assembly is positioned directly adjacent to the ball bearing of the motor shaft 30. This avoids rocking at high frequencies.

In order to avoid dust, removed material and grinding material or the like entering the motor or the bearings a collision disc 84 is provided. The collision disc 84 is mounted between the motor side grinding wheel 22 and the motor flange with a sleeve 86 on the upper end 28 of the motor shaft and also rotates. The motor side, lower surface of the collision disc 84 is positioned in the range of the bottom of the recess in the end face 26. A felt ring 88 is arranged around the sleeve 86 which does not rotate. The felt ring 88 avoids further dust, removed material and grinding material to enter the motor or the bearings. The pin 34 extends through a bore hole in the collision disc 84. In such a way not only the grinding wheel assembly 18, but also the collision disc 84 is driven by the shaft 30.

The present assembly was explained with reference to a precise embodiment with two grinding wheels. It is understood, however, that the assembly may be varied. It is, for example, possible to install a further housing portion similar to the housing portion 16 and to use further grinding wheels in the space formed therebetween. Also, different designs of the bore holes for guiding the electrodes are possible.

What is claimed is:

1. An upgrade assembly kit for a known device for grinding welding electrodes, the known device having a length and comprising a grinding wheel having a thickness and a diameter and having a grinding surface directed in a first direction, a driving motor and a shaft for driving said grinding wheel in a rotational movement about a rotational axis, a two-portion housing said grinding wheel with a first housing portion and a second housing portion, wherein said first and said second housing portion are connected along a plane, and wherein said grinding wheel is rotated in the range of said plane inside said housing; and wherein openings are formed in said first and second housing portion of said two-portion housing for guiding a welding electrode for grinding in a defined angle and position relative to said grinding wheel, the openings in said first housing portion being angled towards said first grinding wheel, the upgrade assembly kit for coupling to the known device, and comprising:
   a further grinding wheel adapted to be coupled to the device with the grinding surface directed in a second direction opposite to said first direction of said first grinding wheel, and wherein the openings in said second housing portion are angled towards said second grinding wheel;
   a spacer ring adapted to be inserted between the first housing portion and the second housing portion, said spacer ring having a diameter corresponding to the diameter of said two-portion housing and a thickness corresponding to the thickness of said grinding wheel to increase said length of said known device by only said thickness of said further grinding wheel when the upgrade assembly kit is coupled, the thickness of the spacer ring thereby compensating for a difference of an axial position of said second grinding surface caused by the further grinding wheel relative to said openings for guiding a welding electrode in order to maintain the grinding angle defined by said openings in said second housing portion, wherein said further grinding wheel is adapted to rotate within said thickness of said spacer ring; and
   a centering sleeve for centering said further grinding wheel to rotate about the same rotational axis as said grinding wheel, and wherein said centering sleeve has an axial length which is larger than said thickness of one of said grinding wheels.

2. The assembly kit of claim 1 for a device with a screw for screwing said grinding wheel to said shaft, the assembly kit further comprising a screw which is longer than the screw provided for the device with the grinding wheel.

3. The assembly kit according to claim 1, and further comprising a housing portion which has at least one opening for guiding a welding electrode for grinding in a defined position relative to said grinding wheel or said further grinding wheel.

4. A device for grinding welding electrodes, the device comprising:
   first and second grinding wheels each having a thickness and a diameter, the first grinding wheel having a grinding surface directed in a first direction and the second grinding wheel having a grinding surface directed in a second direction opposite to said first direction;
   a driving motor and a shaft for driving said grinding wheels in a rotational movement about a common rotational axis;
   a two-portion housing said grinding wheels with a first housing portion and a second housing portion, wherein at least one opening is formed in each of said first and second housing portions for guiding a welding electrode for grinding in a defined angle and position relative to one of said grinding wheels, and the at least one opening in said first housing portion is angled towards said first grinding wheel, and the at least one opening in said second housing portion is angled towards said second grinding wheel;
   an upgraded element that includes one of said grinding wheels and a spacer ring with two sides each defining a plane, said spacer ring adapted to be inserted between the first housing portion and the second housing portion and having a diameter corresponding to the diameter of said two-portion housing and a thickness corresponding to the thickness of said grinding wheel to increase a length of a device to which the upgraded element is coupled by only said thickness of said second grinding wheel, the thickness of the spacer ring thereby compensating for a difference of an axial position of the grinding surface caused by the second grinding wheel relative to said openings for guiding a welding electrode in order to maintain the grinding angle defined by said openings in the two-portion housing, wherein said first housing portion is connected to said spacer ring along a plane on a first side of said spacer ring and wherein said second housing portion is connected to said spacer ring along a plane on a second side of said spacer ring, and wherein a first grinding wheel is rotated in a common space in the range of said plane on said first side of said spacer ring and wherein a second grinding wheel is rotated in a common space in the range of said plane on said second side of said spacer ring; and a centering sleeve for centering said further grinding wheel to rotate about the same axis as said grinding wheel, said centering sleeve having an axial length which is larger than said thickness of one of said grinding wheels.

5. The device of claim 4, and wherein said grinding wheels are coated with grinding material having a grain size, said grain size being different for said first and second grinding wheel, and said opening in one of said housing portions is formed by bore holes having a diameter and an angle relative to one of said grinding wheels, and wherein said diameters are the same as the diameters in said at least one opening formed by bore holes in the other of said housing portions.

6. The device of claim 4, and wherein one of said two grinding wheels is provided with a cutting edge outwardly projecting in a radial direction relative to said rotational axis.

7. The device of claim 4, and wherein a rotating collision disk with an integrated sleeve is provided which is arranged between said housing portion at the motor side and said grinding wheels and which is form-fittingly connected to said shaft by said integrated sleeve.

8. The device of claim 7, and further comprising a ring of soft material, in particular of felt fixed to one of said housing portions which is on the motor-side of said two-portion housing, said ring arranged around said sleeve of said collision disk.

* * * * *